United States Patent
Wyble

(10) Patent No.: US 12,444,229 B2
(45) Date of Patent: Oct. 14, 2025

(54) METHOD AND APPARATUS TO ESTIMATE SCENE ILLUMINANT BASED ON SKIN REFLECTANCE DATABASE

(71) Applicant: InterDigital VC Holdings, Inc., Wilmington, DE (US)

(72) Inventor: David Wyble, Webster, NY (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 157 days.

(21) Appl. No.: 18/410,713

(22) Filed: Jan. 11, 2024

(65) Prior Publication Data

US 2024/0144716 A1    May 2, 2024

Related U.S. Application Data

(63) Continuation of application No. 17/298,357, filed as application No. PCT/US2019/062846 on Nov. 22, 2019, now Pat. No. 11,908,234.

(Continued)

(51) Int. Cl.
*G06V 40/16*    (2022.01)
*G06T 15/50*    (2011.01)
(Continued)

(52) U.S. Cl.
CPC .......... *G06V 40/162* (2022.01); *G06T 15/506* (2013.01); *G06V 10/60* (2022.01); *G06V 20/20* (2022.01)

(58) Field of Classification Search
None
See application file for complete search history.

(56) References Cited

U.S. PATENT DOCUMENTS 6,081,612 A    6/2000    Gutkowicz-Krusin
6,171,768 B1    1/2001    Haraga
(Continued)

FOREIGN PATENT DOCUMENTS

EP    2920766 A2    9/2015
EP    3218076 A1    9/2017
(Continued)

OTHER PUBLICATIONS

International Search Report and Written Opinion of the International Searching Authority for PCT/US2018/067206 mailed Mar. 14, 2019, 9 pages.

(Continued)

*Primary Examiner* — Anand P Bhatnagar
(74) *Attorney, Agent, or Firm* — Klintworth & Rozenblat LLP

(57) ABSTRACT

Some embodiments of a method may include obtaining an image a real-world environment, determining an estimated illuminant spectral power distribution of an illuminant of the real-world environment, and detecting a region of the image representing human skin. The method may further include determining a representative skin color value of the region and based on the estimated illuminant spectral power distribution and the representative skin color value most closely matching the representative color value, selecting a candidate skin reflectance spectrum. The method may further include updating the estimated illuminant spectral power distribution base on the representative skin color value and the selected candidate skin reflectance spectrum.

20 Claims, 11 Drawing Sheets

Related U.S. Application Data

(60) Provisional application No. 62/774,048, filed on Nov. 30, 2018.

(51) Int. Cl.
  *G06V 10/60* (2022.01)
  *G06V 20/20* (2022.01)

(56) References Cited

U.S. PATENT DOCUMENTS

| | | | |
|---|---|---|---|
| 6,678,407 B1 | 1/2004 | Tajima | |
| 7,173,622 B1 | 2/2007 | Mclaughlin | |
| 7,508,961 B2* | 3/2009 | Chen | G06V 10/446 382/118 |
| 7,587,068 B1 | 9/2009 | Steinberg | |
| 7,728,904 B2* | 6/2010 | Quan | H04N 23/673 348/349 |
| 8,154,612 B2* | 4/2012 | Quan | G06T 7/90 600/475 |
| 8,811,729 B2 | 8/2014 | Finlayson | |
| 8,855,412 B2* | 10/2014 | Quan | G06T 7/90 348/222.1 |
| 8,953,906 B2* | 2/2015 | Robles-Kelly | G06V 10/60 382/286 |
| 9,070,192 B1 | 6/2015 | Smith | |
| 9,329,689 B2 | 5/2016 | Osterhout | |
| 9,380,270 B1 | 6/2016 | Worley, III | |
| 10,939,742 B2* | 3/2021 | Fu | G06V 20/20 |
| 11,039,675 B2* | 6/2021 | Fu | G06T 11/60 |
| 11,156,843 B2 | 10/2021 | Freese | |
| 11,344,102 B2* | 5/2022 | Fu | G06T 1/0007 |
| 11,490,584 B1* | 11/2022 | Crowley | A01H 6/4684 |
| 11,676,333 B2* | 6/2023 | Mathur | G06F 3/011 345/426 |
| 11,676,366 B1* | 6/2023 | Cooke | G06V 10/60 382/154 |
| 2005/0041993 A1 | 2/2005 | Barry | |
| 2007/0043527 A1 | 2/2007 | Quan | |
| 2007/0065006 A1 | 3/2007 | Wilensky | |
| 2007/0104472 A1* | 5/2007 | Quan | G03B 7/08 348/E5.045 |
| 2010/0185064 A1* | 7/2010 | Bandic | A61B 5/444 600/306 |
| 2010/0321409 A1 | 12/2010 | Komori | |
| 2011/0024128 A1 | 2/2011 | Kaminsky | |
| 2011/0242128 A1 | 10/2011 | Kang | |
| 2015/0054980 A1 | 2/2015 | Nikkanen | |
| 2015/0338722 A1 | 11/2015 | Bonnier et al. | |
| 2015/0379369 A1 | 12/2015 | Liang | |
| 2016/0240125 A1 | 8/2016 | Sridharan | |
| 2016/0259970 A1 | 9/2016 | Wee | |
| 2016/0270656 A1 | 9/2016 | Samec | |
| 2016/0366331 A1 | 12/2016 | Barron | |
| 2017/0122725 A1 | 5/2017 | Yeoh | |
| 2017/0124928 A1 | 5/2017 | Edwin | |
| 2017/0221273 A1 | 8/2017 | Haseltine | |
| 2017/0304732 A1 | 10/2017 | Velic | |
| 2018/0124387 A1 | 5/2018 | Zhao | |
| 2019/0026937 A1 | 1/2019 | Benoit | |
| 2020/0237286 A1* | 7/2020 | Qiu | A61B 5/442 |
| 2020/0410772 A1 | 12/2020 | Silverstein | |
| 2021/0004995 A1 | 1/2021 | Burg | |
| 2023/0177783 A1* | 6/2023 | Melo | G06V 40/161 345/633 |

FOREIGN PATENT DOCUMENTS

| | | | |
|---|---|---|---|
| EP | 3218076 B1 | 7/2020 | |
| KR | 1020080045175 | 5/2008 | |
| KR | 20160030690 A | 3/2016 | |
| WO | 2004012442 A1 | 2/2004 | |
| WO | 2015192117 A1 | 12/2015 | |
| WO | 2016075081 A1 | 5/2016 | |

OTHER PUBLICATIONS

International Search Report and Written Opinion of the International Searching Authority for PCT/US2019/062846, mailed Apr. 8, 2020, 12 pages.

Cheng, Dongliang, et. al., "Effective Learning-Based Illuminant Estimation Using Simple Features". IEEE Conference on Computer Vision and Pattern Recognition (CVPR), (2015), pp. 1000-1008.

Zhao, Yonghui, et. al., "Methods of Spectral Reflectance Reconstruction for a Sinarback 54 Digital Camera". Rochester Institute of Technology, RIT Scholar Works, Dec. 2004, 37 pages.

International Colour Consortium "Display Calibration". Web Archive dated Dec. 28, 2017, available at: https://web.archive.org/web/20171228205105/www.color.org/displaycalibration.xalter, 3 pages.

"Colorimetry". CIE Publication No. 15, 3rd edition, International Commission on Illustration, Technical Report, (2004), 10 pages.

Judd, Deane B., et. al., "Spectral Distribution of Typical Daylight as a Function of Correlated Color Temperature". Journal of the Optical Society of America, vol. 54, Issue 8, (1964), pp. 1031-1040.

"Facial Recognition Technology: Commercial Uses, Privacy Issues, and Applicable Federal Law." United States Government Accountability Office, Report ID GAO-15-621, Jul. 2015, 54 pages.

Angelopoulou, Elli, "The Reflectance Spectrum of Human Skin". Technical Reports (CIS), Univ. of Pennsylvania, Dept. of Computer and Information Science, Dec. 20, 1999, 16 pages.

Angelopoulou, Elli, "Understanding the Color of Human Skin". Human Vision and Electronic Imaging VI, vol. 4299, International Society for Optics and Photonics, (2001), 9 pages.

Long, Jeremy, et. al., "One-Click White Balance using Human Skin Reflectance". Graphics Interface Conference, May 25-27, 2009, pp. 55-62.

Bianco, Simone, et. al., "Adaptive Color Constancy Using Faces". IEEE Transactions on Pattern Analysis and Machine Intelligence, vol. 36, No. 8, Aug. 2014, pp. 1505-1518.

Chen, Xiaowu, et al., "Single Image Based Illumination Estimation for Lighting Virtual Object in Real Scene". 12th IEEE International Conference on Computer-Aided Design and Computer Graphics, (2011), pp. 450-455.

Störring, Moritz, et. al., "Estimation of the Illuminant Colour from Human Skin Colour". 4th IEEE International Conference on Automatic Face and Gesture Recognition, Mar. 26-30, 2000, pp. 1-7.

Inouye, Michael, "Evolution of Mobile Video". ABI Research for Visionaries, Jul. 2019, 14 pages.

Bianco, Simone, et. al., "Color Constancy Using Faces". IEEE Conference on Computer Vision and Pattern Recognition, (2012), pp. 65-72.

International Preliminary Report on Patentability for PCT/US2018/067206 issued on Jun. 30, 2020, 6 pages.

International Preliminary Report on Patentability for PCT/US2019/062846, issued May 25, 2021, 9 pages.

Chuangchun, Z. et al., "Influences of different light sources of standard illuminants on colorimetric parameters of normal tongue tip color." Journal of Beijing University of Traditional Chinese Medicine vol. 35, No. 1, Jan. 2012, pp. 33-37 (5 pages).

Lee, D. et al,m "A taxonomy of color constancy and invariance algorithm." Advances in low-level color image processing, Dec. 2014 (41 pages).

Qingzong, Z. "Light source color and surface color—Color—not what you think" Oct. 2017, retrieved Dec. 22, 2023 from https://zhuanlan.zhihu.com/p/29848154 (9 pages).

Itoh, Y., et al., "Semi-parametric color reproduction method for optical see-through head-mounted displays." IEEE transactions on visualization and computer graphics vol. 21, No. 11, Nov. 2015, pp. 1269-1278 (10 pages).

Grubert, J., et al., "A Survey of Calibration Methods for Optical See-Through Head-Mounted Displays", IEEE Transactions on Visualization and Computer Graphics, Early Access Article available in IEEE Xplore, vol. 13 No. 9, 2017 (14 pages).

* cited by examiner

METHOD AND APPARATUS TO ESTIMATE SCENE ILLUMINANT BASED ON SKIN REFLECTANCE DATABASE

CROSS-REFERENCE TO RELATED APPLICATIONS

The present application is a continuation of U.S. patent application Ser. No. 17/298,357, filed May 28, 2021, which is a national stage application under 35 U.S.C. 371 of International Application No. PCT/US2019/062846, entitled "Method and Apparatus to Estimate Scene Illuminant Based on Skin Reflectance Database," filed on Nov. 22, 2019, which claims benefit under 35 U.S.C. § 119(e) from U.S. Provisional Patent Application Ser. No. 62/774,048, entitled "Method and Apparatus to Estimate Scene Illuminant Based on Skin Reflectance Database," filed Nov. 30, 2018, all of which are hereby incorporated by reference in their entirety.

BACKGROUND

Many color-accurate rendering processes account for an image's illumination. Algorithms exist for estimating location of a scene illuminant using features found in the image of a scene. Spectral reflectance of human skin may be modeled with a low number of parameters. Augmented reality applications present particular challenges by juxtaposing virtual objects with real-world objects. A lack of realism or accuracy in the colors of the virtual objects may be especially apparent to users when those virtual objects are seen alongside real objects.

SUMMARY

Some embodiments of an example method may include: obtaining an image of a real-world scene; determining a first estimated illuminant spectral power distribution for an illuminant of the real-world scene; identifying, within the image, at least a first region that represents human skin; from the image, determining a representative skin color value for the first region; based on the first estimated illuminant spectral power distribution and the representative skin color value, selecting a first candidate skin reflectance spectrum; and selecting a first updated estimated illuminant spectral power distribution based on the representative skin color value and the selected first candidate skin reflectance spectrum.

For some embodiments of the example method, obtaining the image of the real-world scene may include capturing the image with a camera.

For some embodiments of the example method, determining the representative skin color value may include converting representative RGB coordinates to device-independent color coordinates.

For some embodiments of the example method, selecting of the first candidate skin reflectance spectrum may include: for each of a plurality of stored skin reflectance spectra, determining a respective expected color value by applying the first estimated illuminant spectral power distribution to the respective stored skin reflectance spectrum; and selecting the first candidate skin reflectance spectrum from among the plurality of stored skin reflectance spectra based on comparison of the respective expected color values with the representative skin color value.

For some embodiments of the example method, the first candidate skin reflectance spectrum may be selected to substantially minimize a color difference between the representative skin color value and the expected color value associated with the first candidate skin reflectance spectrum.

For some embodiments of the example method, the selecting of the first candidate skin reflectance spectrum may include: selecting at least one parameter value of a parameterized skin reflectance model to substantially minimize a color difference between: (i) an expected color value obtained by applying the first estimated illuminant spectral power distribution to a skin reflectance spectrum parameterized by the selected parameter value and (ii) the representative skin color value, wherein the first candidate skin reflectance spectrum may be the skin reflectance spectrum parameterized by the selected parameter value.

For some embodiments of the example method, the selecting of the first updated estimated illuminant may include: for each of a plurality of stored illuminant spectral power distributions, determining a respective expected color value by applying the stored illuminant spectral power distribution to the first candidate skin reflectance spectrum; and selecting the first updated estimated illuminant from among the candidate based on comparison of the respective expected color values with the representative color value.

For some embodiments of the example method, determining the respective expected color value may include: applying a spectral camera model to generate camera RGB coordinates; and converting the camera RGB coordinates to device-independent color coordinates representing the respective expected color value.

For some embodiments of the example method, the plurality of stored illuminant spectral power distributions may include a plurality of International Commission on Illumination, CIE, standard illuminants.

Some embodiments of the example method may further include performing iterative refinement by a method which may include: based on the first updated estimated illuminant spectral power distribution and the representative skin color value, selecting a second candidate skin reflectance spectrum; and selecting a second updated estimated illuminant spectral power distribution based on the representative skin color value and the selected second candidate skin reflectance spectrum.

Some embodiments of the example method may be performed by an augmented reality device, and the method may further include rendering a virtual object using the first updated estimated illuminant spectral power distribution as an illuminant of the virtual object.

Some embodiments of an example system may include a processor and a non-transitory computer-readable medium storing instructions operative to perform a method which may include: obtaining an image of a real-world scene; determining a first estimated illuminant spectral power distribution for an illuminant of the real-world scene; identifying, within the image, at least a first region that represents human skin; from the image, determining a representative skin color value for the first region; based on the first estimated illuminant spectral power distribution and the representative skin color value, selecting a first candidate skin reflectance spectrum; and selecting a first updated estimated illuminant spectral power distribution based on the representative skin color value and the selected first candidate skin reflectance spectrum.

Some embodiments of an additional example method may include: obtaining an image of a real-world scene; identifying, within the image, at least a first region that represents human skin; from the image, determining a representative skin color value for the first region; based on the representative color value, selecting at least one candidate skin color value from among a plurality of candidate skin color values, where each of the candidate skin color values is associated with a respective illuminant; and selecting, as an estimated illuminant for the real-world scene, the respective illuminant associated with the selected candidate skin color value.

Some embodiments of the additional example method may be performed by an augmented reality device, the method may further include rendering a virtual object using the estimated illuminant as an illuminant of the virtual object.

For some embodiments of the additional example method, the candidate skin color values may be stored skin color values associated with respective predetermined illuminants.

The entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—may only properly be read as being constructively preceded by a clause such as "In at least one embodiment, . . . ." For brevity and clarity of presentation, this implied leading clause is not repeated ad nauseum in the detailed description.

EXAMPLE NETWORKS FOR IMPLEMENTATION OF THE EMBODIMENTS

A wireless transmit/receive unit (WTRU) may be used, e.g., as a camera, illumination estimator, and/or an augmented reality display device in some embodiments described herein.

Figure 1A:
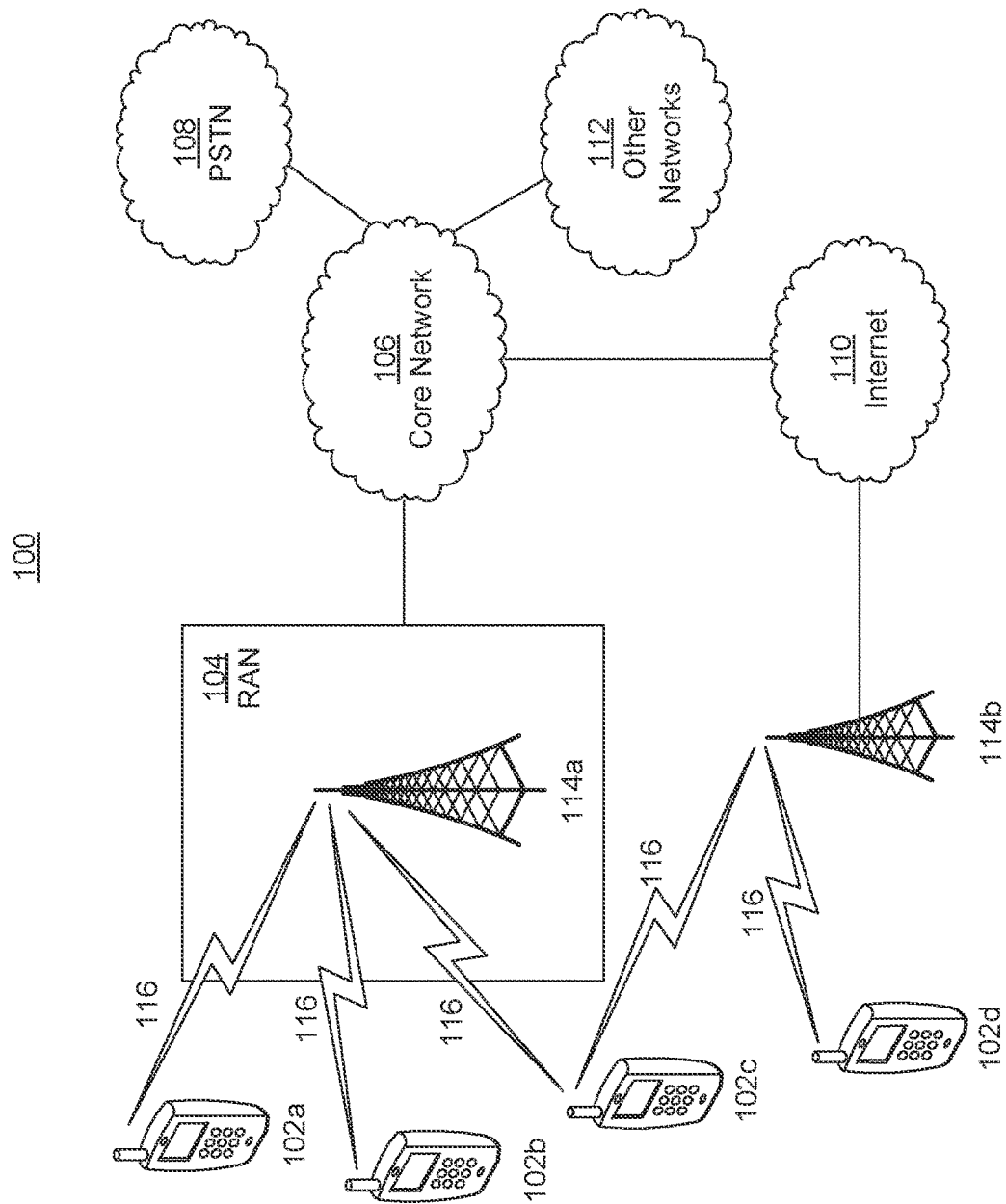
FIG. 1A is a system diagram illustrating an example communications system according to some embodiments.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
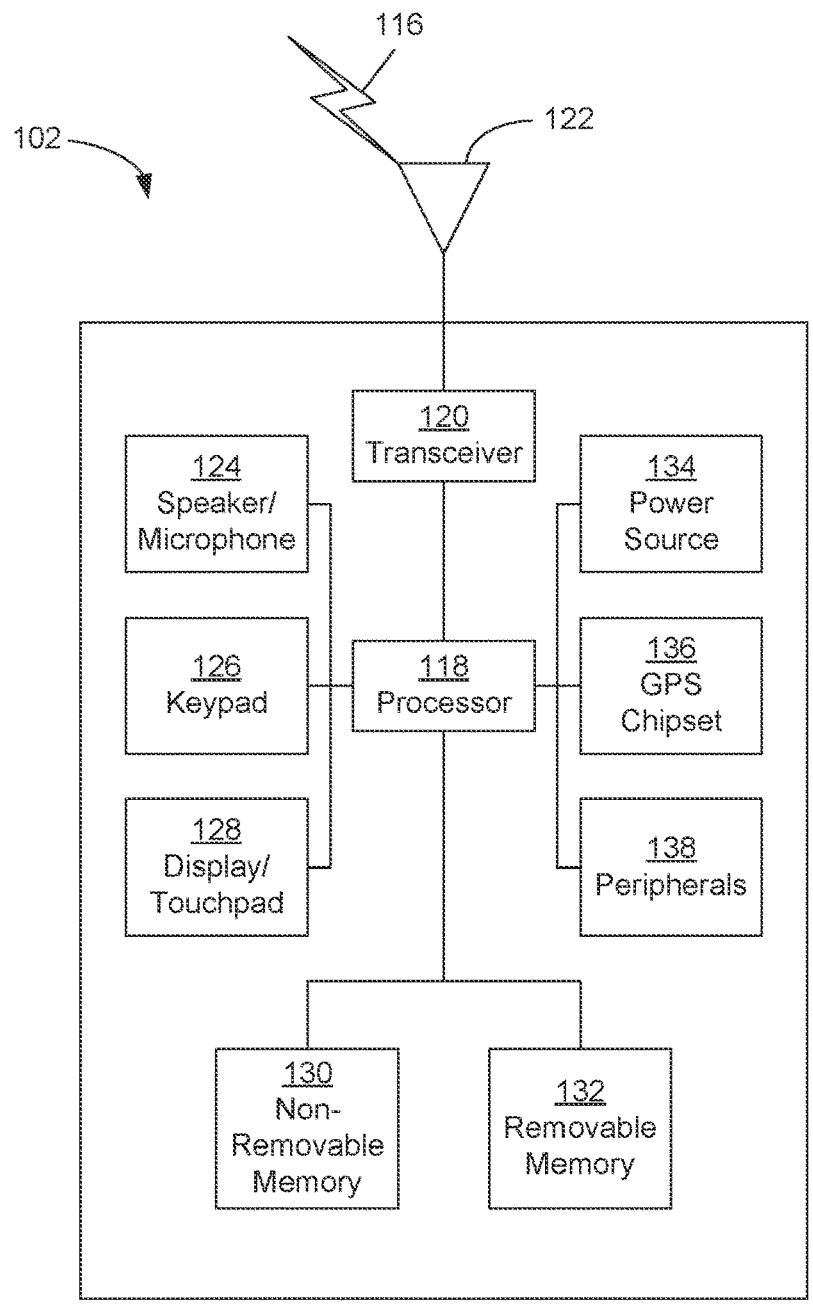
FIG. 1B is a system diagram illustrating an example wireless transmit/receive unit (WTRU) that may be used within the communications system illustrated in FIG. 1A according to some embodiments.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

In view of FIGS. 1A-1B, and the corresponding description of FIGS. 1A-1B, one or more, or all, of the functions described herein with regard to one or more of: WTRU 102a-d, Base Station 114a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

A system that captures and displays images (e.g., a head mounted display, phone, or tablet) accounts for the scene illuminant when rendering images to the display in order to create the most accurate renderings of images. If AR content is to be inserted accurately into real-world imagery, the AR content may be rendered under the same scene illuminant. Many digital cameras do not adapt to the illuminant in a scene. Therefore, if the scene illuminant changes, the RGB signals for an object change. Some illuminant estimation algorithms are based on scene features that are not related to the faces or skin tones. The rendering of skin colors may be degraded for such methods.

Scene illumination in some systems may be controlled (e.g., by a director), measured (e.g., with a colorimeter), or estimated. One system (U.S. Pat. No. 8,811,729) uses two different sets of color filters when capturing reflected light from a scene, and "in a method of chromagenic illuminant estimation[,] pixels from mutually-corresponding images with different filtering are compared, a fraction of the brightest pixels being selected for a subsequent chromagenic estimation." (Abstract, U.S. Pat. No. 8,811,729).

If skin tones are rendered with adjustments for illumination, the appearance of the rendered scene may be improved. Color and spectral power distribution of the illumination in an image of a scene may be estimated and used to render AR objects added to an image. Estimation of illuminant based on some imaging devices may be limited to red-green-blue (RGB) or other color coordinates. Spectral power distribution data for the illuminant may enable more accurate rendering of AR imagery and may enable a color management system to be optimized for vision properties of an observer. Illumination data for an image of a scene may be used to preserve color consistency, to balance colors, and to control light exposure, among other properties of an image. Incorrect illumination may be used to detect image alteration and impacts to realism of synthetic content in an augmented and/or mixed reality context.

The spectral power distribution of an illumination source may be applied to a spectral workflow, which may include adjusting the spectral nature of the balance of a system. For some embodiments, a non-metameric rendering process may be used with data for a set of observer personalized color matching functions, as well as spectral reflectance properties of inserted imagery. Such a process may increase realism of inserted AR objects added to an image.

Figure 2A:
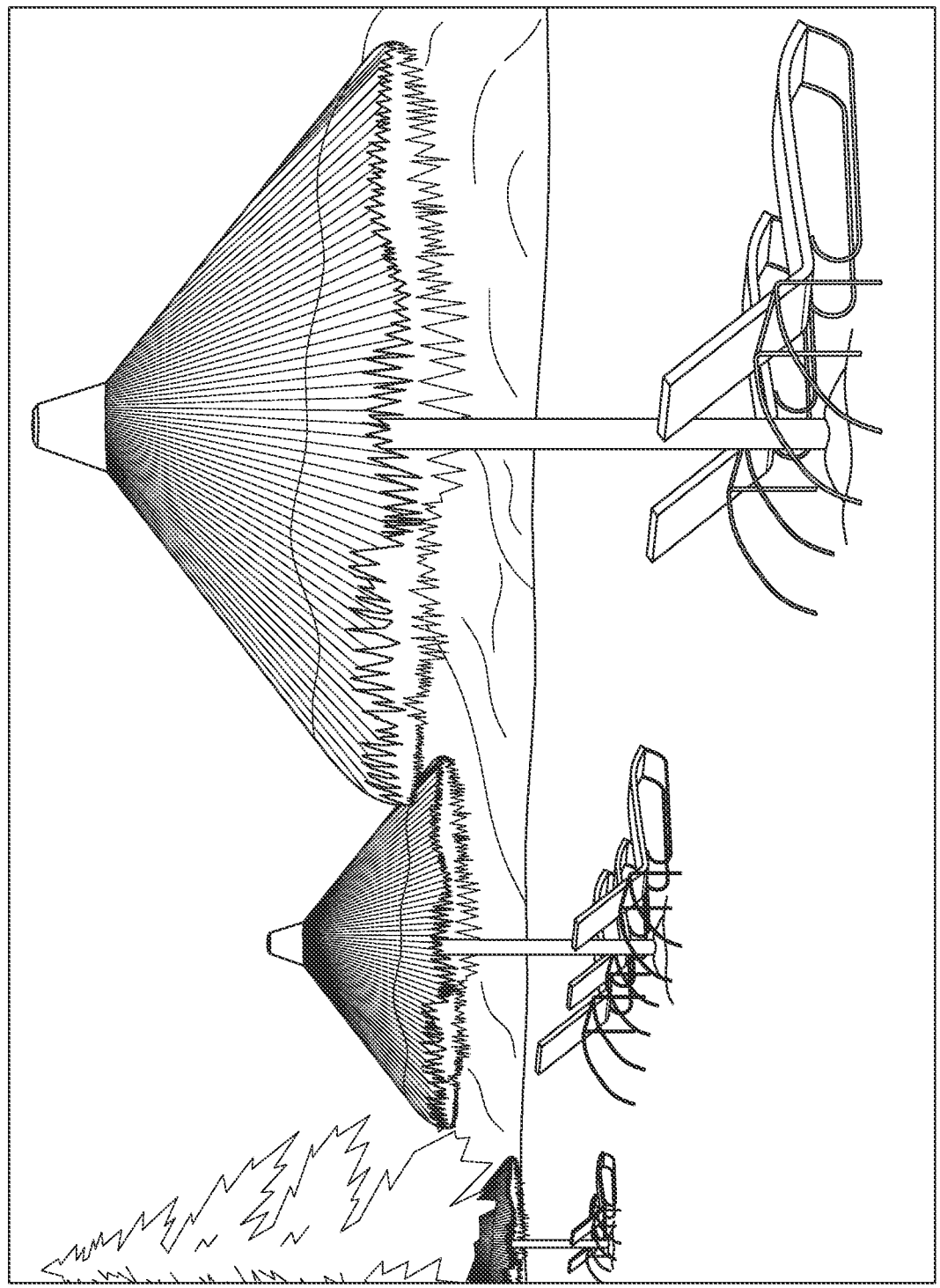
FIGS. 2A and 2B are illustrations showing an example addition to an image of an augmented reality (AR) object that accounts for lighting geometry according to some embodiments.
Figure 2B:
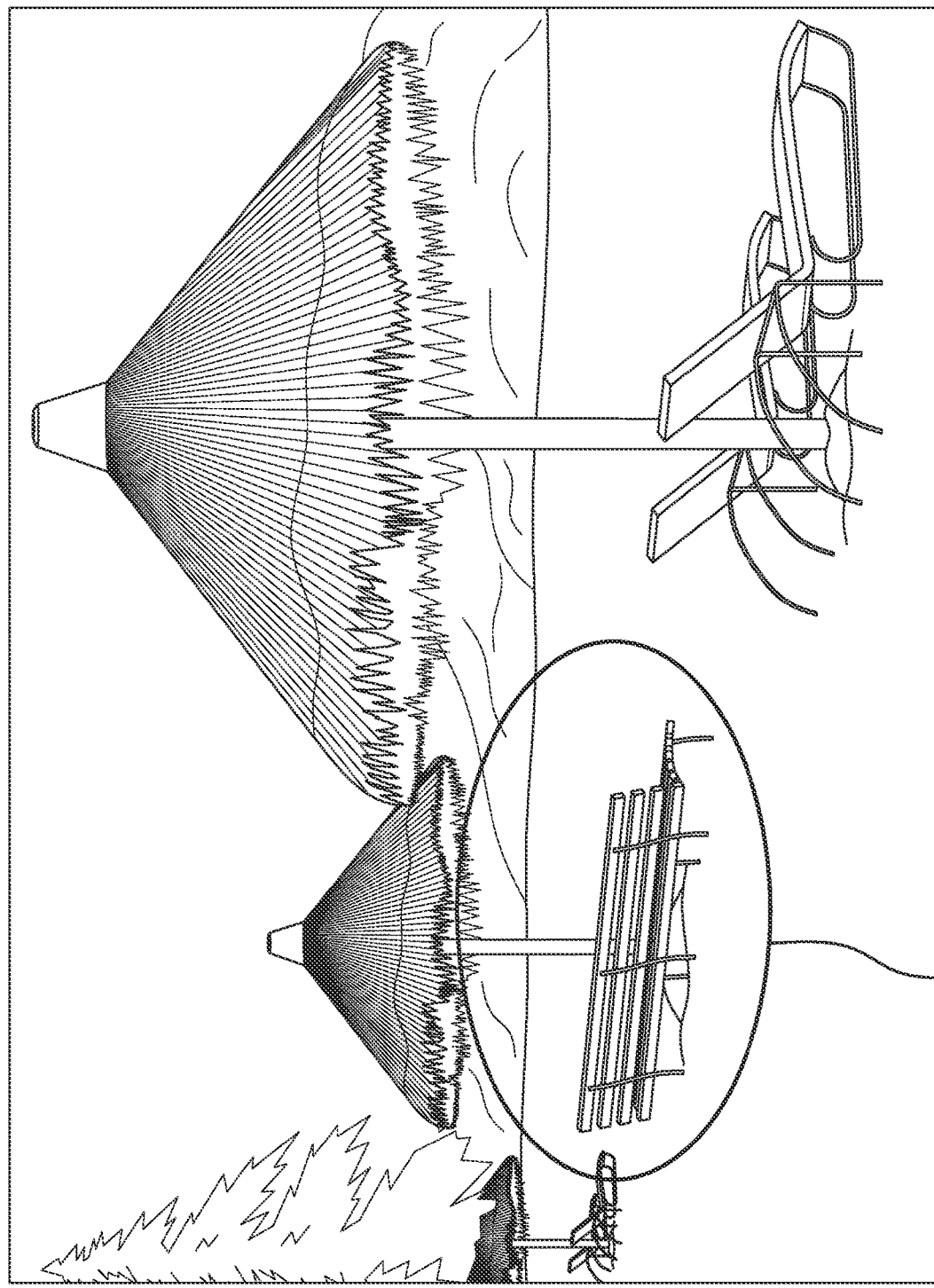

FIGS. 2A and 2B are illustrations showing an example addition to an image of an augmented reality (AR) object that accounts for lighting geometry according to some embodiments. FIG. 2A shows the original image 200 of a beach without any augmented reality objects added to the image. FIG. 2B shows the same image 250 with an AR object of a bench 252 added to the image 250. The virtual bench 252 and surrounding area may be adjusted to account for the lighting geometry and the illuminant of the scene.

In one use case for an embodiment implemented on a see-through augmented reality (AR) head-mounted display (HMD), a user of the AR HMD is in an unfurnished room and wishes to view an AR representation of what the room would look like with different furnishings. To do this, the users AR HMD obtains a virtual model of, for example, a particular sofa. The AR display could show a representation of the sofa in the room without taking into consideration the actual lighting conditions in the room. Such a representation of the sofa may be useful in determining whether the sofa is the proper size for the room, but it is likely to provide an inaccurate representation of the color of the sofa. To provide a more accurate representation of the color of the sofa, example embodiments operate to estimate the real-world lighting conditions and to render the sofa such that it appears as if it were illuminated under the estimated real-world lighting conditions. To estimate the real-world lighting conditions, the users AR HMD captures an image of the real-world scene and automatically identifies a region of visible human skin in the image. The AR HMD determines an estimate of lighting conditions based on the detected color of the skin region. For example, the AR HMD may select, from among a set of predetermined lighting conditions, which lighting conditions were most likely to have produced the detected skin color. The virtual sofa may then be rendered using the selected lighting conditions, providing the user with a more accurate representation of what a real sofa would look like in the room under the current lighting conditions.

An example process for some embodiments may add an augmented reality (AR) object, such as a couch, to an image of a real-world environment of a person in a living room. The spectrum of an illuminant may be estimated using observations of light reflected from skin and a database of spectral reflectance of human skin (which may include a set of skin color matches) or a parametric model of skin reflectance. An image of the real-world environment may include a person's face or other regions representing human skin. An AR object, such as a couch, may be added to an AR environment that includes the real-world image. The lighting of the AR object (such as a couch) may be adjusted. The example process may estimate a white point (which may be the illuminant for a scene) and adapt AR content (such as lighting of AR content) added to an AR environment captured in the image. Some embodiments may adjust the lighting of the real-world image, which may include an image of a person and a living room. For example, an image of a real-world environment may be adjusted to use a different illumination color in an AR environment. An example process, which may be used to adjust the lighting of one or more AR objects added to an AR environment that includes an image of a real-world environment, is described below with regard to FIG. 3.

A head mounted display (HMD) or a hand-held camera or display (e.g., phone or tablet) system may include a camera and a display viewed by an observer. Some embodiments of methods described herein may be performed with an optical see-through head mounted display (HMD) or see-through augmented reality (AR) display device. The see-through AR display device may include a camera for capturing images of a real-world environment. The see-through AR display device may display a virtual object on the AR display and may enable a user to see the AR object on top of an image of the real-world environment. For some embodiments, a scene white point may be estimated and used as the rendering white point for display imagery. Some embodiments may estimate a scene white point spectrally and not as three color coordinates. Methods described herein may use spectral sensitivity of a camera and a database on human skin reflectance spectra and/or a low-parameter model of human skin reflectance spectra. The term "faces" used below may be replaced with the terms "skin tones" or "skin regions" of an image for some embodiments.

For some embodiments, a bootstrap method may be used to estimate the spectral power distribution (SPD) of a scene white point. Color coordinates of a white point may be determined based on RGB camera data. Faces (or regions representing human skin) may be detected in an image. The spectral reflectance of one or more faces may be estimated using a skin reflectance spectral database model by virtually illuminating with light having the same color as an estimated white point. The spectral power distribution of a scene white point may be estimated from facial spectral reflectance and camera spectral sensitivity functions (and for some embodiments, other goggle parameters, such as transmittance). One or more faces may be used with estimation of spectral power distribution of a scene white point. Using more faces may result in a better spectral power distribution estimate.

Some embodiments may determine the spectral power distribution of an illuminant by using RGB image camera data and a spectral database of skin reflectance, such as the MERL/ETH Skin Reflectance Database. An AR image object added to an image may be rendered using such a process, which may enable a color management system to account for the vision properties of an observer. An augmented reality device may be used to render a virtual object using an (updated) estimated illuminant spectral power distribution as an illuminant of the virtual object.

Figure 3:
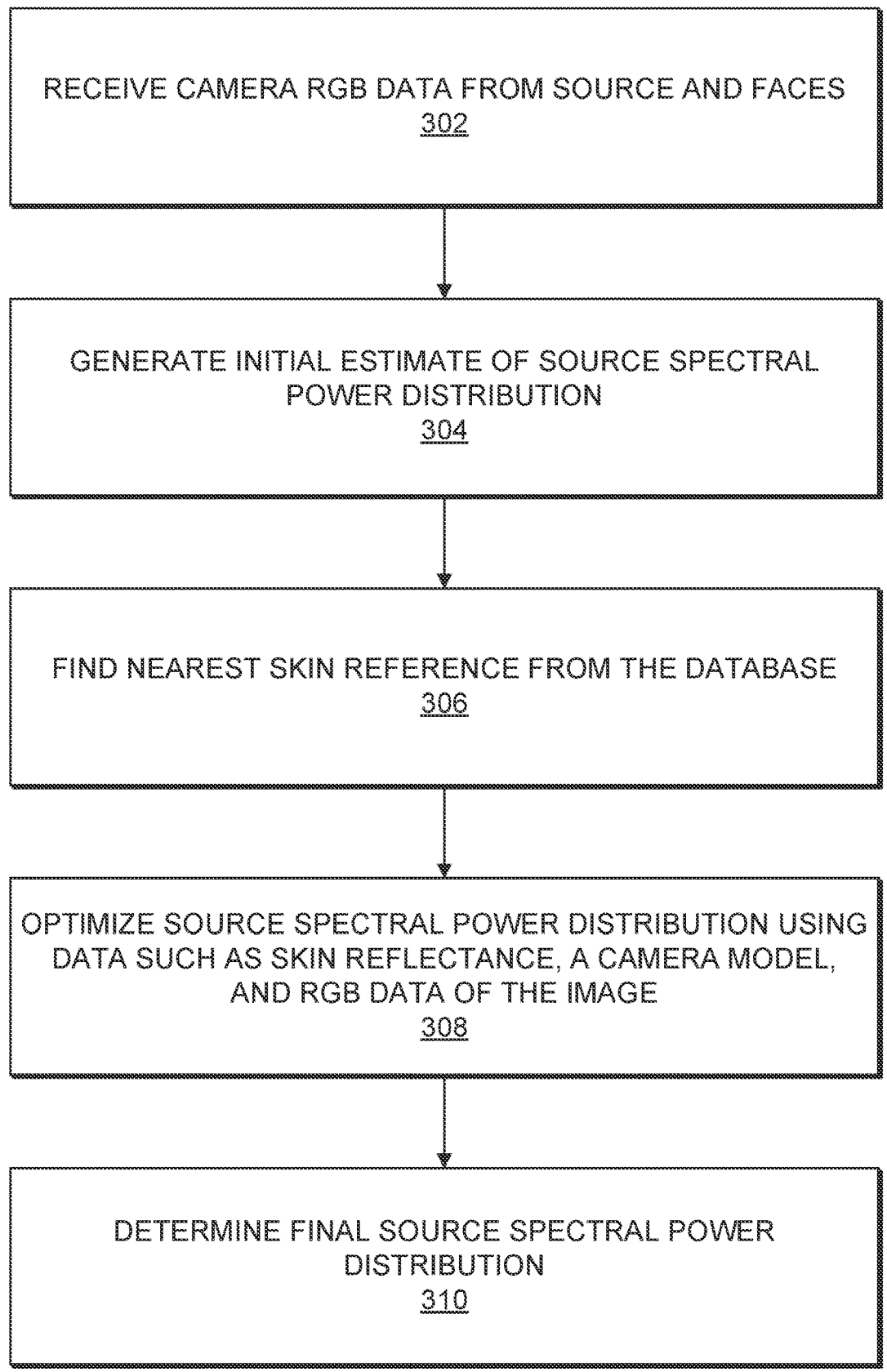
FIG. 3 is a flowchart illustrating an example process for determining source spectral power distribution in an image according to some embodiments.

FIG. 3 is a flowchart illustrating an example process for determining source spectral power distribution in an image according to some embodiments. A system may include, for some embodiments, a calibrated camera able to estimate International Commission on Illumination XYZ Tristimulus values (CIE XYZ) from red-green-blue (RGB) values, a display (such as an HMD, a phone, or a tablet) viewed by an observer, and a processor with access to a skin reflectance database and a database of probable illuminants.

For some embodiments, an example process 300 is shown in FIG. 3. A camera image may be captured (or received 302), such as the example shown in FIG. 3. Source and skin (or face) regions of the camera image may be determined automatically. An estimate of a prospective illuminant may be generated. An initial estimate of the source's spectral power distribution may be generated 304. The spectral power distribution generated may be based on the prospective illuminant estimate. For some embodiments, an iterative process may be used to determine an estimated illuminant. Such an iterative process may select a prospective illuminant from a plurality of illuminants and may repeat to select another prospective illuminant. The system may search a database to find 306 a match (or best match for some embodiments) with the skin color and/or skin reflectance for each skin region. The source's spectral power distribution (SPD) may be re-calculated and optimized 308 using data such as skin reflectance, a camera model, and RGB data for the image. This optimization process may be an iterative process that continues until the color difference between the captured image and the calculated color for a portion of a region (such as a pixel) is less than a threshold. The calculated color may be calculated using a source SPD, a skin reflectance model, a camera model, and RGB data. If the system determines that the color difference is less than a threshold, the system may determine 310 and output a final source spectral power distribution. The calculation of a source SPD may be an iterative process that iteratively selects an illuminant from a plurality of illuminants for some embodiments. The process 300 shown in FIG. 3 is described in more detail below. For some embodiments, an iterative process of updating the estimated illuminant type may include: determining an expected color value for a portion of the region using the estimated illuminant type; and updating the estimated illuminant type to reduce a difference between the expected color value and a captured color value of the portion of the region, such that the iterative process is repeated until the difference is less than a threshold.

Selecting an updated estimated illuminant may include determining, for each of a plurality of stored illuminant spectral power distributions, a respective expected color value by applying the stored illuminant spectral power distribution to the candidate skin reflectance spectrum and selecting the updated estimated illuminant based on a comparison of the respective expected color values with a representative color value for a region on an image.

Figure 4:
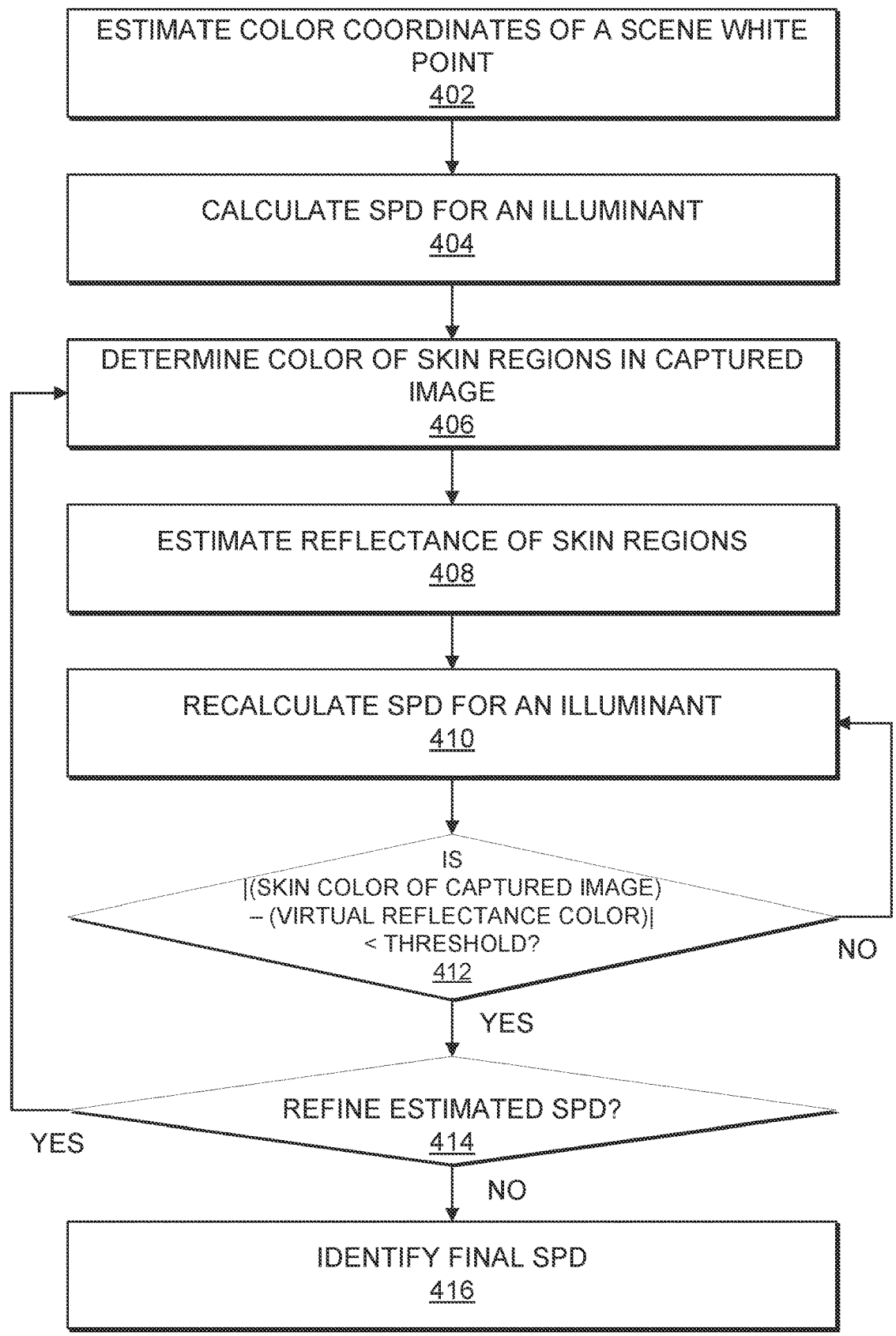
FIG. 4 is a flowchart illustrating an example scene illumination estimation process according to some embodiments.

FIG. 4 is a flowchart illustrating an example scene illumination estimation process according to some embodiments. An example scene illumination estimation process 400 may include, for some embodiments, inferring (or estimating 402) the color coordinates of a scene white point using camera data. An image of a scene may be captured and RGB data may be generated for the scene viewed by an observer. An illuminant estimation algorithm may be applied to estimate an illuminant of the scene. Examples of such algorithms include applying a gray-world assumption, searching for specular highlights, or searching for an assumed white material, among other techniques. RGB data may be extracted (or determined) for an identified scene white point of the captured image. The RGB data for the scene white point may be processed with a camera model to estimate device-independent color coordinates (such as CIE XYZ or CIELAB values).

For some embodiments, CIE XYZ or CIELAB values for a white point may be converted to chromaticity coordinates x and y. The spectral power distribution (SPD) of the corresponding CIE daylight series illuminant may be calculated 404. The technical report *Colorimetry*, INTERNATIONAL COMMISSION ON ILLUMINATION, CIE Publication 15: 2004 (2004) and the journal article DB Judd, DL MacAdam, G Wyszecki, *Spectral Power Distribution of Typical Daylight as a Function of Correlated Color Temperature*, 54 J. OF THE OPTICAL SOCIETY OF AMERICA 1031-1040 (1964) describe methods and information that may be used to calculate the spectral power distribution (SPD) of a corresponding CIE daylight series illuminant. Further information is provided in Colorimetry, 4TH Ed, CIE 015:2018. One or more illuminant sources may be estimated, and the illuminant source may be chosen from a plurality (or even infinite number) of choices.

A scene illumination estimation process 400 may, for some embodiments, determine 406 the color of skin regions (or faces for some embodiments) in a captured image of the scene. One or more skin regions may be identified in the captured image. Mean RGB coordinate data may be captured (or generated) for the scene. Mean RGB coordinate data may be extracted for each identified skin region. The extracted mean RGB coordinate data for each skin region may be processed with a camera model to estimate device-independent color coordinates (such as CIE XYZ or CIELAB data). The estimated device-independent color coordinates may indicate a color that includes the scene source and skin reflectance. Some embodiments may use a representative color value for a skin region of a captured image. The representative color value may be represented using, for example, standardized Red Green Blue (sRGB), International Commission of Illumination XYZ (CIE XYZ), International Commission of Illumination LUV (CIELUV), or International Commission of Illumination L*a*b (CIELAB).

Some embodiments of a scene illumination estimation process may estimate 408 the reflectance of the skin regions in the scene. A match (or best match for some embodiments) to skin color for each skin region may be found in a skin reflectance database using an estimated illuminant's SPD. The estimated illuminant's SPD may be an SPD determined for an illuminant source as described above, and the skin color may be the estimated device-independent color coordinates as described above. A skin reflectance database may be searched for some embodiments to determine a match, e.g. by finding a minimum error between (i) the skin color of the region and (ii) a color generated by applying the estimated illuminant to reflectance information of respective entries in the database. Some embodiments may determine a match by using a statistical method, such as regressing skin database principal components against an illuminant's SPD. A principal components analysis (PCA) method may generate a closer match to the captured image's color for a portion of a skin region. A regression may fit weights to spectral components derived from a skin reflectance database using PCA. If PCA is used, estimated skin spectral reflectance may be reconstructed by applying the estimated weights to the principal components. For some embodiments, an expected skin value may be calculated for each skin region based in part on the SPD of an estimated or prospective illuminant. The expected skin value may further be calculated based in part on skin reflectance of a skin region. For some embodiments, identifying an illuminant type may include performing, for each prospective illuminant selected from a plurality of illuminants, an iterative illuminant comparison process that includes: selecting the prospective illuminant from the plurality of illuminants; and comparing the representative color value with an expected skin value determined using the prospective illuminant. Identifying the illuminant type may further include selecting the illuminant type from the plurality of illuminants using the comparison of the representative color value with the expected skin value determined using the respective prospective illuminant.

A scene illumination estimation process 400 for some embodiments may recalculate 410 the estimated SPD of the illuminant. Recalculation of the estimated SPD for the illuminant may be an iterative optimization process. A candidate SPD may be selected, and a virtual reflectance off a skin region may be generated using a skin reflectance model retrieved from a database. The virtually reflected light may be passed through a camera's spectral model, which may include camera spectral sensitivity data. Camera RGB data may be the output of the camera's spectral model. The camera RGB data may be processed through the camera model to yield device-independent color coordinates (e.g., CIE XYZ or CIELAB). Some embodiments may apply properties of an observers vision to generate an observer-specific match. The difference between the color for a portion of a skin region in the captured image and the virtual reflectance's device-independent color coordinates may be calculated. If the difference is less than a threshold quality level 412, the iterative optimization process may be exited. Otherwise, the SPD for an illuminant may be recalculated 410. Comparing the color (or representative color value) of skin regions in a captured image with a virtual reflectance color (or expected skin value) may include calculating a spectral power distribution of a prospective illuminant such that the expected skin value is determined using the spectral power distribution of the prospective illuminant, for example using the process described above.

Some embodiments of a scene illumination estimation process may be iterative. The scene illumination estimation process may be repeated iteratively using the estimated SPD determined by the iterative optimization process. A process or calculation may be used to determine whether to further refine the estimated SPD for the estimated illuminant. If the estimated SPD is to be refined 414, another candidate SPD may be selected, and the iterative optimization process may be repeated with the selected candidate SPD. Some embodiments may use device-dependent values for a representative color of a skin region (or a portion of a skin region for some embodiments) of a captured image. Expected color values (or expected color coordinates or expected pixel values for some embodiments) of a skin region for a virtual reflectance may be device-dependent values for some embodiments. Selecting a scene illuminant estimate may be performed in a device-dependent color space for some embodiments. Selecting a scene illuminant estimate may be performed in a device-independent color space for some embodiments. Eventually, a final SPD may be identified 416. The iterative refinement process may include selecting a candidate skin reflectance spectrum based on a representative skin color value and an updated estimated illuminant spectral power distribution and selecting a further-updated estimated illuminant spectral power distribution based on the representative skin color value and the selected candidate skin reflectance spectrum.

Figure 5:
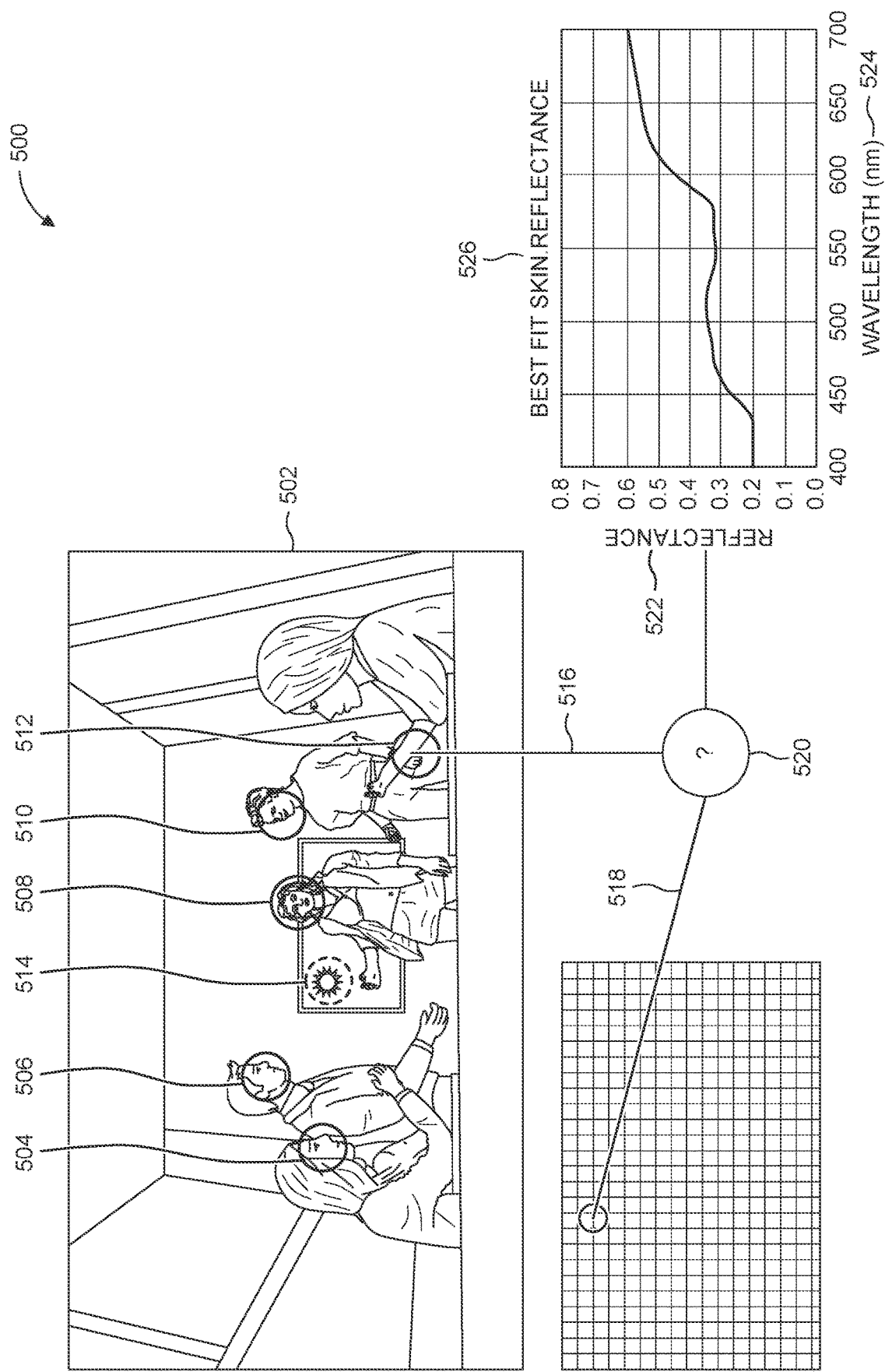
FIG. 5 is an illustration showing an example process for determining an illuminant and reflectance model parameters and/or values according to some embodiments.

FIG. 5 is an illustration showing an example process for determining an illuminant and reflectance model parameters and/or values according to some embodiments. In FIG. 5, the dashed circle indicates a source region, and the solid circles indicate skin regions. Circles are used to help identify the regions in the picture shown in FIG. 5, but the actual regions may have different shapes. An example process 500 may be performed to generate an initial estimate of the scene white point of an image 502 based on one or more specular highlights (e.g., the bright spot in the dashed circle 514). One or more skin regions 504, 506, 508, 510, 512 (indicated as solid circles in FIG. 5) may be detected. The color for each portion (e.g., 516) of each skin region (e.g., 512) in the captured image may be determined. For some embodiments, the color of each portion of each skin region in the captured image 502 may be a representative color value that is an average of two or more color values of portions of a skin region. An estimated illuminant and the color (or, e.g., wavelength 524) of the portion (e.g., 516) of the skin region (e.g., 512) in the captured image may be used to find in a database a skin reflectance value 522 or a set of skin reflectance model parameters that matches (or is a best fit 526 for some embodiments) for each portion of each identified skin region. The difference 520 between a representative value 516 and a skin color value 518 may be minimized and used to estimate an illuminant. The estimated illuminant may be used to determine a skin reflectance value 522 for the wavelength 524 of the skin color value 518. The skin reflectance value may be used to identify an illuminant type for the real-world environment.

For some embodiments, selecting a candidate skin reflectance spectrum may include determining, for each of a plurality of stored skin reflectance spectra, a respective expected color value by applying an estimated illuminant spectral power distribution to the respective stored skin reflectance spectrum, and selecting a candidate skin reflectance spectrum from among the plurality of stored skin reflectance spectra based on a comparison of the respective expected color values with the representative skin color value. The candidate skin reflectance spectrum may be selected to substantially minimize or reduce a color difference between the representative skin color value and the expected color value associated with the candidate skin reflectance spectrum. For some embodiments, selecting a candidate skin reflectance spectrum may include selecting at least one parameter value of a parameterized skin reflectance model to substantially minimize or reduce a color difference between (i) an expected color value obtained by applying the first estimated illuminant spectral power distribution to a skin reflectance spectrum parameterized by the selected parameter value and (ii) a representative skin color value, such that the candidate skin reflectance spectrum is the skin reflectance spectrum parameterized by the selected parameter value.

Figure 6:
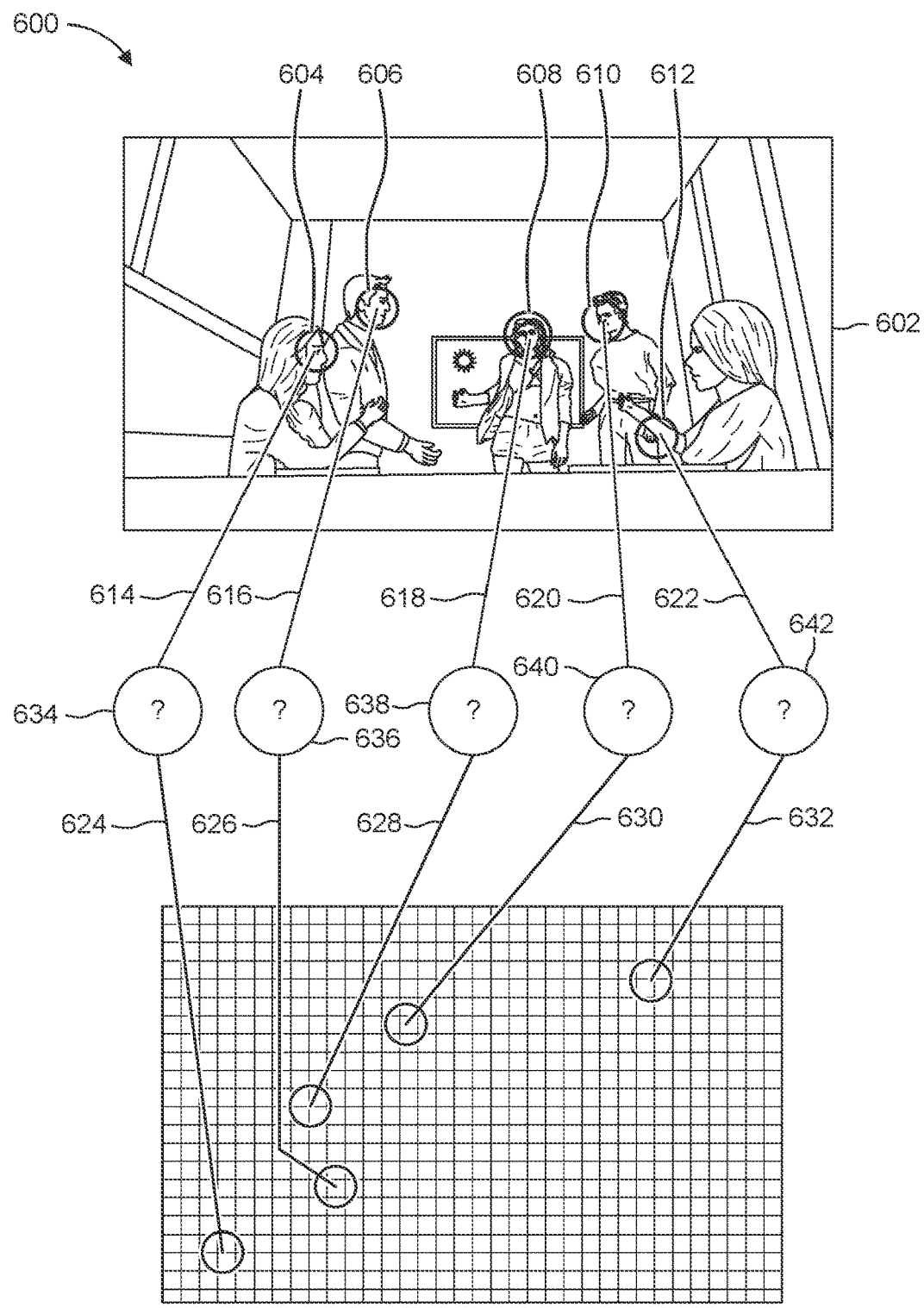
FIG. 6 is an illustration showing an example process for refining illuminant and reflectance model parameters and/or values according to some embodiments.

FIG. 6 is an illustration showing an example process for refining illuminant and reflectance model parameters and/or values according to some embodiments. The example process 600 shown in FIG. 6 may use reflectance (model parameters and/or values) to refine estimation of the illumination. The solid circles 604, 606, 608, 610, 612 overlaying the image 602 indicate skin regions identified in the captured image 602. The solid circles 624, 626, 628, 630, 632 in the lower portion of FIG. 6 indicate skin color values corresponding to skin reflectance values found in a database that match (or represent best estimates for some embodiments) the identified skin regions 604, 606, 608, 610, 612 in the captured image 602. An estimated illuminant may be used to calculate reflectance of each skin region and to determine spectral matches with the skin colors observed for each skin region. The process may minimize color differences 634, 636, 638, 640, 642 for a skin region between the observed color 614, 616, 618, 620, 622 and the color 624, 626, 628, 630, 632 determined using the estimated illuminant and skin reflectance value and/or set of skin reflectance parameters.

For some embodiments, selecting a skin color value may include minimizing a color difference value (e.g., 634, 636, 638, 640, 642) between a representative color value (e.g., 614, 616, 618, 620, 622) and a prospective color value (e.g., 624, 626, 628, 630, 632). Some embodiments of the process may calculate a color difference value for each skin region, add up each color difference value for the plurality of skin regions, and minimize the total. The output of the process is the illuminant that minimized the error. For some embodiments, the reflectance results may be used to update iteratively the estimated illuminant. For some embodiments, the prospective (or test candidate) illuminant may be updated iteratively until the difference between the representative color value and the expected skin value for each skin region is less than a threshold. Some embodiments may update the prospective illuminant iteratively until the sum of each skin region's error is less than a threshold.

Figure 7:
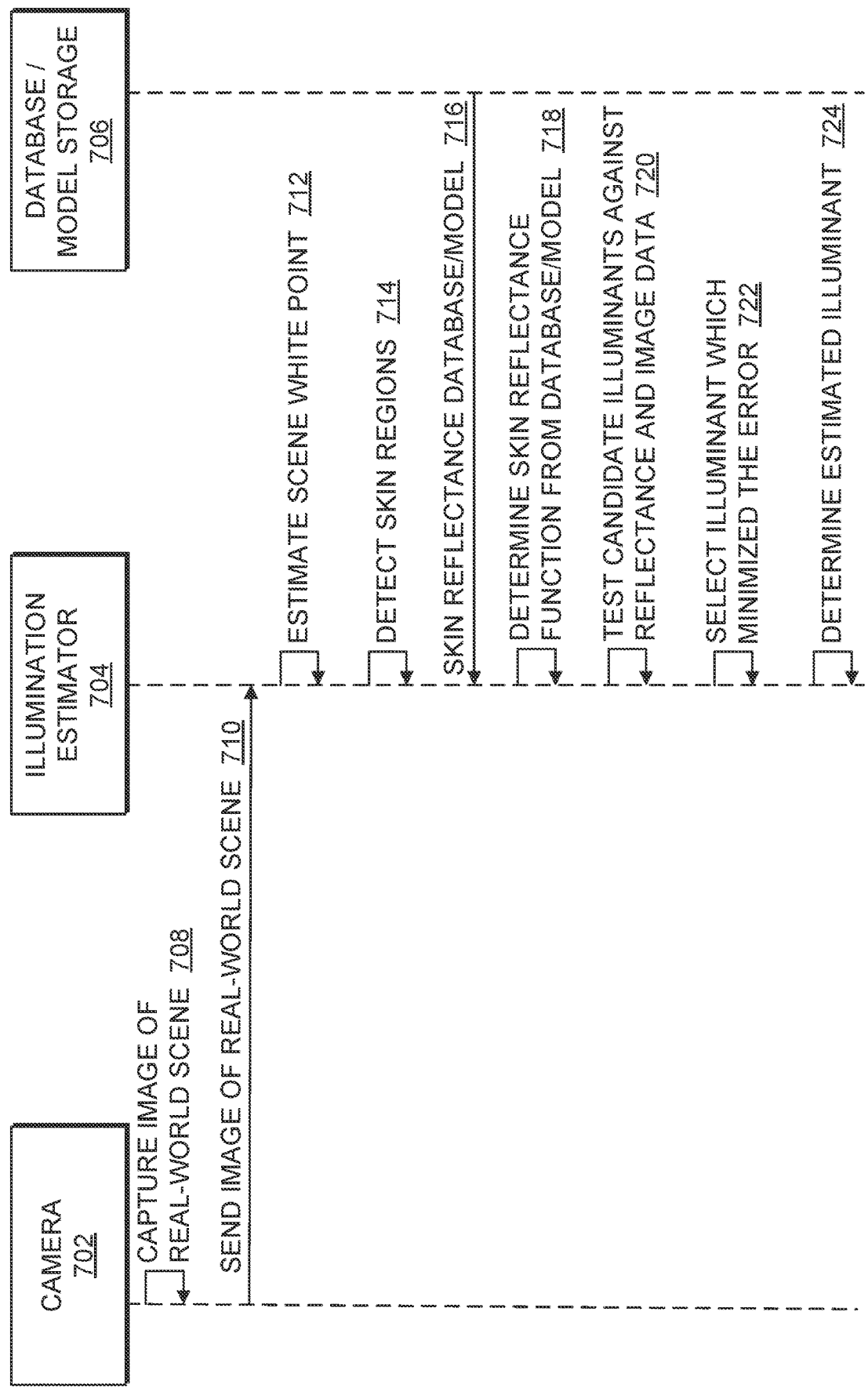
FIG. 7 is a message sequencing diagram illustrating an example process for selecting an illuminant which minimizes errors for a skin reflectance model in comparison with a captured image according to some embodiments.

FIG. 7 is a message sequencing diagram illustrating an example process for selecting an illuminant which minimizes errors for a skin reflectance model in comparison with a captured image according to some embodiments. For some embodiments of a process 700, a camera 702 may capture 708 an image of a real-world scene and send 710 the image to an illumination estimator 704. The image may be a frame of a video, or the image may one of a series of frames from a video. For some embodiments, the illumination estimator 704 may obtain (or receive) an image of a real-world scene. An illumination estimator 704 may be a software and/or hardware module. Some embodiments may have the illumination estimator 704 as part of the camera, and some embodiments may have the illumination estimator 704 as a separate module on a server. The illumination estimator 704 may estimate 712 a scene white point (or scene illuminant for some embodiments) in the captured image and may detect 714 skin regions in the captured image. A skin region may be a group of one or more pixels in the image for some embodiments. The illumination estimator 704 may receive 716 information related to a skin reflectance database/model from a database/model storage 706. A skin reflectance model may be a set of one or more skin reflectance functions approximating a skin reflectance of a scene illuminant estimate. A skin reflectance model may be a set of one or more skin reflectance functions that is a parameterized model of skin reflectance. For some embodiments, the database/model storage 706 may be memory storage that is connected locally to the illumination estimator 704 and/or camera, and for some embodiments, the database/model storage 706 may be on a server. The illumination estimator 704 may determine 718 a skin reflectance function from a database/model. Some embodiments may determine an expected pixel value corresponding to an illuminant's spectrum (or SPD) and a set of skin reflectance functions. The illumination estimator 704 may test 720 candidate illuminants using reflectance and image data. Testing of candidate illuminants may be performed iteratively. An illuminant which minimizes the error in comparison with the captured image (or reduces the error to less than a threshold for some embodiments) may be selected 722 and may be determined 724 to be the estimated illuminant. Determining and selecting an estimated illuminant may be an iterative process that includes iteratively determining, for each skin region, a set of one or more skin reflectance functions approximating skin reflectance of the estimated illuminant.

For some embodiments, selecting a scene illuminant estimate may be an iterative process including determining, for each skin region, a set of one or more skin reflectance functions approximating skin reflectance of a scene illuminant estimate. The iterative process may include determining, for each skin region, an expected pixel value corresponding to an estimated scene illuminant's illuminant spectrum and a set of skin reflectance functions. The iterative process may include iteratively updating a scene illuminant estimate and, for each skin region, the set of one or more skin reflectance functions and the expected pixel value until, for each region of pixels representing human skin, the error between each color value and the expected pixel value is less than a threshold. For some embodiments, selecting a scene illuminate estimate may be a process that minimizes, for each region of pixels representing human skin, an error between a color value of a corresponding pixel of the image and an expected pixel value corresponding to an illuminant spectrum of a scene illuminant estimate and a set of skin reflectance functions approximating a skin reflectance of the scene illuminant estimate. For some embodiments, the process may further include: obtaining an image of a real-world scene; determining a first scene illuminant estimate; determining one or more regions of pixels in the image representing human skin; determining, for each region of pixels representing human skin, a first set of one or more skin reflectance functions approximating a skin reflectance of the first scene illuminant estimate; determining, for each region of pixels representing human skin, a first expected pixel value corresponding to an illuminant spectrum of the first scene illuminant estimate and the first set of skin reflectance functions; and selecting a second scene illuminant estimate to minimize, for each region of pixels representing human skin, an error between a color value of a corresponding pixel of the image and a second expected pixel value corresponding to an illuminant spectrum of the second scene illuminant estimate and a second set of skin reflectance functions approximating a skin reflectance of the second scene illuminant estimate. Candidate skin color values may be stored skin color values that are associated with predetermined illuminants.

Figure 8:
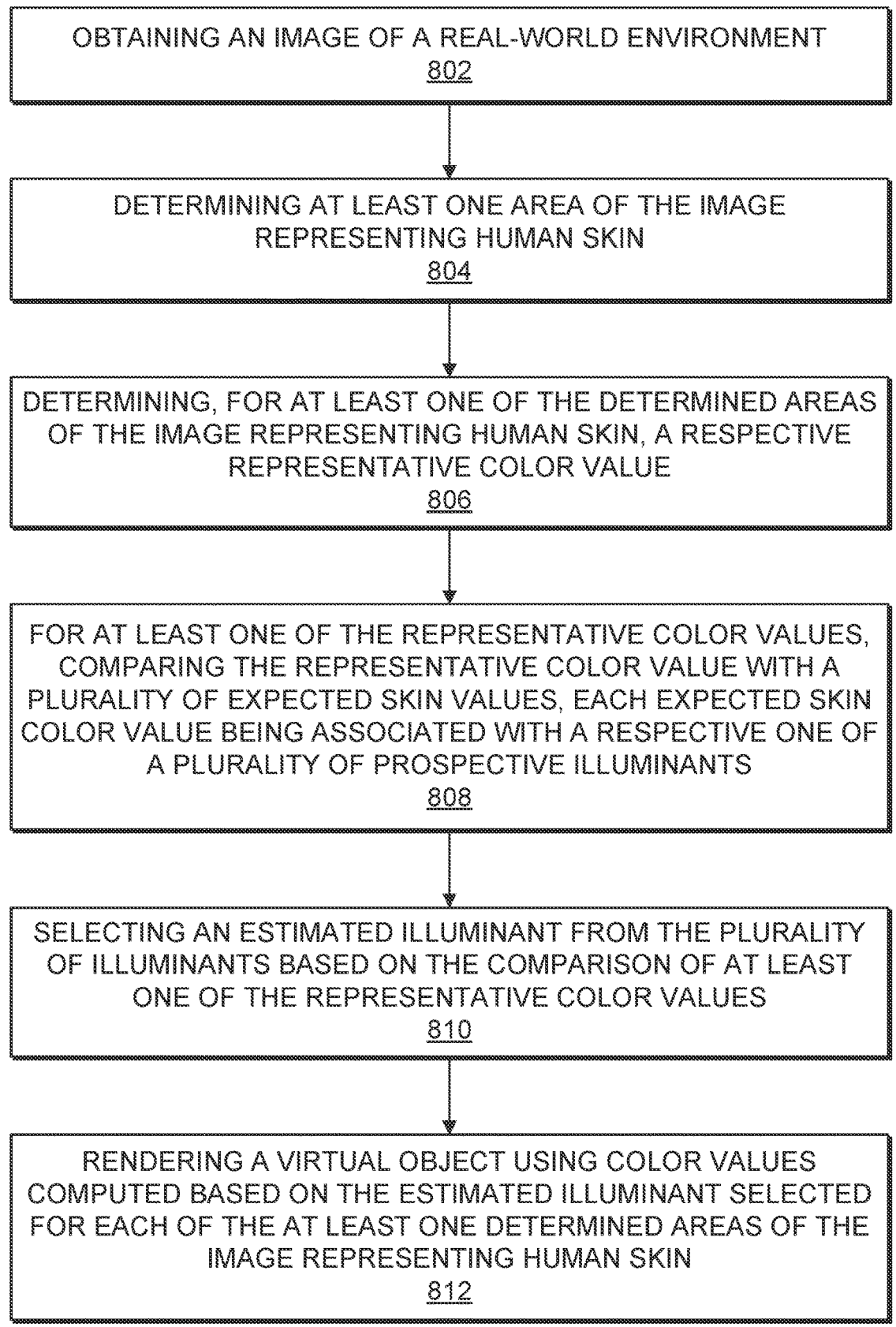
FIG. 8 is a flowchart illustrating an example process for selecting an illuminant for one or more regions of a captured image representing human skin according to some embodiments.

FIG. 8 is a flowchart illustrating an example process for selecting an illuminant for one or more regions of a captured image representing human skin according to some embodiments. For some embodiments, an illuminant estimation process 800 may include obtaining 802 a real-world image of a real-world environment. The image may be captured by the illumination estimation process 800 or may be received by the process 800. The process 800 may include determining 804 at least one area of the real-world image representing human skin. The determined area may be part of a face for some embodiments and may be other parts of the body covered by skin for some embodiments. The illuminant estimation process 800 may include determining 806, for at least one of the determined areas of the real-world image representing human skin, a respective representative color value. The representative color value may be formatted for sRGB, CIE RGB, CIE XYZ, CIELUV, CIELAB, or another paradigm for some embodiments. The representative color value also may be converted from one format to another format for some embodiments. The illuminant estimation process 800 may include comparing 808, for at least one of the representative color values, the representative color value with a plurality of expected skin color values, each expected skin color value being associated with a respective one of a plurality of prospective illuminants. The comparison may compare a representative color value with values stored in a database for some embodiments. Some embodiments may perform an illuminant comparison process for each prospective illuminant selected from a plurality of illuminants. Such an illuminant comparison process may select 810 a prospective illuminant from the plurality of illuminants and compare, for each skin area of the image, a representative color value with an expected skin value in which the expected skin value is determined based on the prospective illuminant. The illuminant estimation process 800 may include selecting 810, for each of the at least one determined areas of the real-world image representing human skin, an estimated illuminant from the plurality of illuminants based on the comparison of at least one of the representative color values. For some embodiments, the selection may select the estimated illuminant as the illuminant that minimizes an error (or reduces an error to less than a threshold for some embodiments) between the representative color and an expected skin value determined based on the illuminant. In alternative embodiments, expected skin values may be determined based on skin reflectance, such as a skin reflectance determined according to one of the example processes described earlier.

A process 800 may include rendering 812 a virtual object using color values computed based on the illuminant selected for each of the at least one determined areas of the real-world image representing human skin. Rendering a virtual object may include adjusting the lighting of the virtual object to match or be similar to lighting of a real-world image. Rendering a virtual object may include adjusting color values for portions of a virtual object to incorporate an estimated illuminant of a real-world scene. A parameterized model of skin reflectance may be used to render a virtual object with lighting conditions similar to an estimated illuminant. For example, a relationship between object color adjustment and skin reflectance for an illuminant may be determined, and such a relationship may be used in rendering a virtual object in an augmented reality environment. Some embodiments may be an apparatus that includes a processor and a non-transitory computer-readable medium storing instructions that are operative, when executed by the processor, to perform a method described herein, such as the method described with FIG. 8, for example. Some embodiments may capture or obtain raw image data of a real-world environment and not modify the raw image data as part of determining an estimated illuminant and rendering a virtual object based on the estimated illuminant. For some embodiments, a real-world illuminant is used to generate a virtual illuminant in an augmented reality environment. The process 800 may be performed in real-time.

For some embodiments, a process may include: capturing an image of a real-world environment; detecting a region of the image representing human skin; determining a representative color value of the region; selecting, from a plurality of prospective color values, a skin color value most closely matching the representative color value; identifying an illuminant type associated with the skin color value; and rendering a virtual object with colors selected based on the identified illuminant type. For some embodiments, a process may include: obtaining an image of a real-world scene; determining a first estimated illuminant spectral power distribution for an illuminant of the real-world scene; identifying, within the image, at least a first region that represents human skin; from the image, determining a representative skin color value for the first region; based on the first estimated illuminant spectral power distribution and the representative skin color value, selecting a first candidate skin reflectance spectrum; and selecting a first updated estimated illuminant spectral power distribution based on the representative skin color value and the selected first candidate skin reflectance spectrum. Such a process may be performed by a system with a processor and a non-transitory computer-readable medium storing instructions operative to perform the process. For some embodiments, a process may include: obtaining an image of a real-world scene; identifying, within the image, at least a first region that represents human skin; from the image, determining a representative skin color value for the first region; based on the representative color value, selecting at least one candidate skin color value from among a plurality of candidate skin color values, where each of the candidate skin color values is associated with a respective illuminant; and selecting, as an estimated illuminant for the real-world scene, the respective illuminant associated with the selected candidate skin color value. The prospective color values may be in a database stored locally on a device executing the process or in a database stored on a server. Rendering a virtual object may render the virtual object in an augmented reality display environment of a head-mounted display (HMD). Rendering the virtual object may overlay the virtual object on top of a captured image of a real-world environment. Such an overlaying process may cause some of the pixel values of the captured image to be replaced with pixel values of the virtual object. An apparatus capable of executing a method described herein may include a camera, a processor, and a non-transitory computer-readable medium storing instructions that are operative, when executed by the processor, to perform the method. The apparatus may be an augmented reality head-mounted display (HMD).

Figure 9:
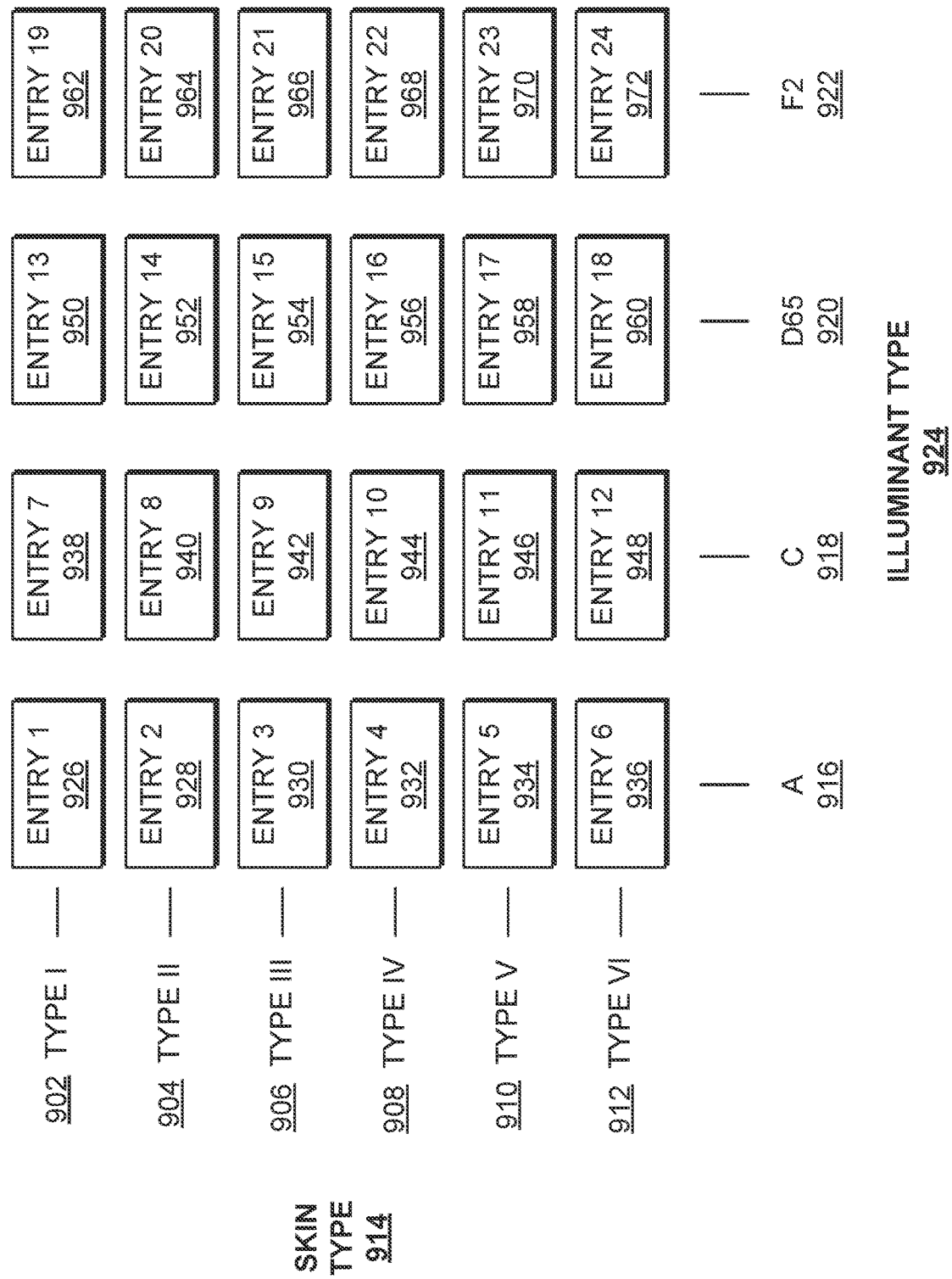
FIG. 9 is a schematic illustration of skin chromaticity data for skin types and illuminant types that may be used in some embodiments.

FIG. 9 is a schematic illustration of skin chromaticity data for skin types and illuminant types that may be used in some embodiments. The data 900 may be stored in a database, a table, or other data structure. Each entry 926, 928, 930, 932, 934, 936, 938, 940, 942, 944, 946, 948, 950, 952, 954, 956, 958, 960, 962, 964, 966, 968, 970, 972 is associated with a respective skin type 914 and with a respective illuminant type 924. The skin types 914 may be, for example, skin types I-VI (902, 904, 906, 908, 910, 912) of the Fitzpatrick scale (in which type I is the lightest skin and type VI is the darkest skin), though a finer-grained or coarser-grained scale may alternatively be used. The illuminant types 924 may include standard illuminant types such as those published by the International Commission on Illumination (CIE). In the illustration of FIG. 9, the data includes entries for standard illuminant types A (916), C (918), D65 (920), and F2 (922).

In some embodiments, each entry 926, 928, 930, 932, 934, 936, 938, 940, 942, 944, 946, 948, 950, 952, 954, 956, 958, 960, 962, 964, 966, 968, 970, 972 in the data 900 of FIG. 9 includes a pair of chromaticity values, such as chromaticity coordinates (x, y). The chromaticity coordinates may be stored in a camera-dependent or camera-independent form. The chromaticity coordinates represent the chromaticity of the associated skin type under the associated illuminant type. The chromaticity data may be in the form CIE x,y coordinates or in another form, including CIEXY, CIELAB, CIELUV, and the like.

In some embodiments, the chromaticity coordinates in each entry are determined as follows. The illuminant spectrum of the associated illuminant type is multiplied by the reflectance spectrum of the associated skin type to obtain a reflected spectrum. The reflected spectrum is processed through a camera spectral model that uses camera spectral sensitivity data of the AR device's camera to generate RGB values for the reflected spectrum. The RGB values are then converted into chromaticity coordinates.

For some embodiments, a camera may be used to capture an RGB image of a real-world environment. The RGB image data may be used to estimate an illuminant color of the real-world environment. A spectral power distribution may be estimated for the illuminant color. Regions of the image representing skin tones may be detected, and the RGB image data may be used to estimate the color of skin tones in those regions. A spectral reflectance may be obtained from a skin tone database using the estimated skin tone colors. A spectral camera model may be used to obtain the spectral reflectance. Determining an expected color value may include applying a spectral camera model to generate camera RGB coordinates and converting the camera RGB coordinates to device-independent color coordinates representing the expected color value. Determining a representative skin color value may include converting RGB coordinates to device-independent color coordinates. The spectral reflectance may be obtained using the estimated illumination source. An iterative process may be performed for each skin tone region detected in the image. The iterative process may iterate across candidate spectral illuminants until one or more illuminants are determined to be a fit for the skin tone regions detected in the image. For some embodiments, a spectral estimation of a scene illuminant of the real-world environment may include determining if the real-world environment is indoors or outdoors. The determination of indoors or outdoors may be used in determining an initial spectral estimate of a scene illuminant. The candidate spectral illuminants may be selected from among a plurality of stored skin reflectance spectra that include a plurality of International Commission on Illumination (CIE) standard illuminants.

In using the data of FIG. 9, the camera of the AR device captures an image of a real-world scene, and a region of exposed skin in the scene is automatically detected (e.g., using known face-detection techniques). A representative color value of the skin-containing region is determined, e.g., by averaging the RGB values of a plurality of image pixels that are determined with a high confidence to represent a region of skin of an individual and converting the average RGB value into representative chromaticity coordinates. A search is performed through the example entries 926, 928, 930, 932, 934, 936, 938, 940, 942, 944, 946, 948, 950, 952, 954, 956, 958, 960, 962, 964, 966, 968, 970, 972 of FIG. 9 to determine which entry contains stored chromaticity coordinates that correspond most closely to the representative chromaticity coordinates from the image. The match may be determined by finding a minimum error term between the stored chromaticity coordinates and the representative chromaticity coordinates, The error term may be measured as, for example, a sum of absolute errors or a sum of square errors over the x and y chromaticity coordinates. The illuminant associated with the matching entry is then used in the rendering of virtual content for display on the AR display.

The illuminant types shown in FIG. 9 are examples, and some embodiments may have different types and/or different numbers of illuminant types than the examples shown. Some examples of illuminant types may include: A (incandescent), B (direct sunlight at noon), C (north sky daylight), D50 (5000K horizon light), D55 (5500K mid-morning/mid-afternoon light), D65 (6500K noon daylight), D75 (7500K north sky daylight), E (equal light), F1 (daylight fluorescent), F2 (cool white fluorescent), F3 (white fluorescent), F4 (warm white fluorescent), F5 (daylight fluorescent), F6 (light white fluorescent), F7 (D65 simulation), F8 (D50 simulation), F9 (cool white deluxe fluorescent), F10 (5000K fluorescent), F11 (4000K fluorescent), F12 (3000K fluorescent), TL83 (commercial lighting simulation of F12 illuminant), TL84 (commercial lighting simulation of F11 illuminant), and TL85 (commercial lighting simulation of F10 illuminant). For some embodiments, identifying the illuminant type may include determining a skin reflectance value corresponding to the skin color value. Identifying the illuminant type may include: selecting an estimated illuminant type from a plurality of prospective illuminant types; determining a reflectance value corresponding to the skin color value and the estimated illuminant type; and updating iteratively the estimated illuminant type to be the identified illuminant type using at least one of the determined reflectance value, the representative color value, and the selected skin color value.

In alternative embodiments, a parametric skin color model may be used. As one example, skin chromaticity values (x, y) under a particular illuminant may be represented as a function of a parameter p, where p may represent a level (e.g., percentage) of skin melanin or another parameter. Each illuminant may then be associated with a different function, such as a function $(x, y)=f_{D65}(p)$ for chromaticity under illuminant D65 (daylight) or a function $(x, y)=f_A(p)$ for chromaticity under illuminant A (incandescent). In such embodiments, the selected illuminant may be found as follows. For each available illuminant Z, find a value $p_Z$ that minimizes the error $E_Z$ between the calculated chromaticity $(x, y)=f_Z(p_Z)$ and the representative chromaticity generated from the real-world image, and select the illuminant Z that gives the lowest error $E_Z$. The error $E_Z$ may be calculated as, for example, a sum of absolute errors or a sum of square errors over the x and y chromaticity coordinates. For some embodiments, prospective color values may be generated from a parameterized model or may be determined using a parameterized model, for example, as described above. Selecting a skin color value may include selecting a prospective skin color value from a plurality of skin color values such that the selected prospective skin color value has a minimum error measure (for example, as described above) in comparison with the representative skin color value.

Some embodiments may use spectral imaging to determine the spectra (or spectral power distribution) of a skin (or face) region in a scene or captured image. For example, a scene illuminant may not be measured directly. Some embodiments may measure a white object in the field or a determined specular reflection or may use another method to determine spectral power of an illuminant.

Some embodiments may use a low-parameter model of skin reflectance in addition to or instead of a database of skin reflectance data to iteratively estimate illumination spectral distribution. Estimating the reflectance of a skin (or face) region in a scene may refine (iteratively for some embodiments) parameters of a skin reflectance model instead of searching in a database for a best match (or a match that generates an error less than a threshold for some embodiments). A parameterized model may be used to generate a spectral reflectance function in some embodiments, and the spectral reflectance function may be used to determine skin reflectance data.

Some scenes may contain multiple illuminants (for example, a mixed environment of incandescent and white LED illumination). Some embodiments may determine the spectral power distribution (SPD) of the mixed illuminant and may render a virtual object based on the SPD of the mixed illuminant.

Some embodiments may use the spectral reflectance of one or more skin regions with facial recognition methods. Some current facial recognition methods generally rely on physiological features, including spatial information (such as distance between eyes), and behavioral features (such as voice or gait). See the report *Facial Recognition Technology: Commercial Uses, Privacy Issues, and Applicable Federal Law*, United States Government Accountability Office, Report ID GAO-15-621 (July 2015). Adding skin reflectance to facial recognition algorithms may increase the accuracy of such search algorithms.

While the methods and systems in accordance with some embodiments are discussed in the context of augmented reality (AR), some embodiments may be applied to mixed reality (MR)/virtual reality (VR) contexts as well. Also, although the term "head mounted display (HMD)" is used herein in accordance with some embodiments, some embodiments may be applied to a wearable device (which may or may not be attached to the head) capable of, e.g., VR, AR, and/or MR for some embodiments.

An (RGB) image capture and display system may receive a relative spectral power distribution (SPD) of an illuminant of a real-world environment. The spectral nature of other components (camera sensitivities, display properties, and observer properties, for example) may be determined a priori. To estimate the spectral nature of the scene illuminant from RGB or other color coordinates, a skin spectral reflectance database may be compared to skin tones found in the scene. A bootstrap method may be applied iteratively to determine a scene spectral illuminant and to minimize color difference between a captured image and virtual skin colors from a database.

Some embodiments of a method may include: obtaining an image of a real-world environment; determining at least one area of the image representing human skin; determining, for at least one of the determined areas of the image representing human skin, a respective representative color value; for at least one of the representative color values, comparing, for each of the at least one determined areas of the image representing human skin, the representative color value with an expected skin value determined based on a prospective illuminant chosen from a plurality of illuminants; selecting an estimated illuminant from the plurality of illuminants based on the comparison of at least one of the representative color values; and rendering a virtual object using color values computed based on the estimated illuminant selected for each of the at least one determined areas of the image representing human skin.

For some embodiments, for each of the at least one determined areas of the image representing human skin, the representative color value may be an average of color values for a portion of the image comprising at least a portion of the at least one determined areas of the image representing human skin.

With some embodiments, for each of the at least one determined areas of the image representing human skin, the representative color value may be selected from the group consisting of sRGB, CIE RGB, CIE XYZ, CIELUV, and CIELAB.

In some embodiments, determining the representative color value and comparing the representative color value with a plurality of expected skin values may be performed in a device-dependent color space for each of the at least one determined areas of the image representing human skin.

For some embodiments, determining the representative color value and comparing the representative color value with a plurality of expected skin values may be performed in a device-independent color space for each of the at least one determined areas of the image representing human skin.

With some embodiments, a method may further include: calculating a spectral power distribution of the prospective illuminant, wherein the expected skin value for each of the at least one determined areas of the image representing human skin may be further determined based on the spectral power distribution of the prospective illuminant.

In some embodiments of a method, the expected skin value for each of the at least one determined areas of the image representing human skin may be further determined based on skin reflectance of the determined area.

For some embodiments, selecting the estimated illuminant may include minimizing a plurality of difference values, each difference value corresponding to a difference for one of the at least one determined areas of the image representing human skin between the representative color value and the expected skin value.

With some embodiments, a method may further include updating iteratively the prospective illuminant based on the comparison of the representative color value with the expected skin value corresponding to the prospective illuminant prior to updating until, for each of the at least one determined areas of the image representing human skin, a difference between the representative color value and the expected skin value is less than a threshold.

In some embodiments, the prospective illuminant is a mixture of two or more illuminants chosen from the plurality of illuminants.

Some embodiments of a method may include: obtaining an image of a real-world scene; determining a first scene illuminant estimate; determining one or more regions of pixels in the image representing human skin; determining, for each region of pixels representing human skin, a first set of one or more skin reflectance functions approximating a skin reflectance of the first scene illuminant estimate; determining, for each region of pixels representing human skin, a first expected pixel value corresponding to an illuminant spectrum of the first scene illuminant estimate and the first set of skin reflectance functions; and selecting a second scene illuminant estimate to minimize, for each region of pixels representing human skin, an error between a color value of a corresponding pixel of the image and a second expected pixel value corresponding to an illuminant spectrum of the second scene illuminant estimate and a second set of skin reflectance functions approximating a skin reflectance of the second scene illuminant estimate.

With some embodiments, determining the first set of one or more skin reflectance functions may include accessing a database of a plurality of skin reflectance functions.

For some embodiments of a method, the first set of one or more skin reflectance functions may include a parameterized model of skin reflectance.

In some embodiments of a method, selecting the second scene illuminant estimate may include determining, for each region of pixels representing human skin, the second set of one or more skin reflectance functions approximating the skin reflectance of the second scene illuminant estimate.

For some embodiments of a method, selecting the second scene illuminant estimate may include: determining, for each region of pixels representing human skin, the second set of one or more skin reflectance functions approximating the skin reflectance of the second scene illuminant estimate; determining, for each region of pixels representing human skin, the second expected pixel value corresponding to the illuminant spectrum of the second scene illuminant estimate and the second set of skin reflectance functions; and iteratively updating the second scene illuminant estimate and, for each region of pixels representing human skin, the second set of one or more skin reflectance functions and the second expected pixel value until, for each region of pixels representing human skin, the error between each color value and the second expected pixel value is less than a threshold.

With some embodiments of a method, the first scene illuminant estimate is a mixture of two or more scene illuminants.

For some embodiments, a method may further include rendering a virtual object using an illuminant spectrum determined for the second scene illuminant estimate.

Some embodiments of a method may include: determining the first set of one or more skin reflectance functions, determining the first expected pixel value, and selecting the second scene illuminant estimate are performed in a device-dependent color space.

For some embodiments, a method may include determining the first set of one or more skin reflectance functions, determining the first expected pixel value, and selecting the second scene illuminant estimate are performed in a device-independent color space.

Some embodiments of an apparatus may include: a processor; and a non-transitory computer-readable medium storing instructions that are operative, when executed by the processor, to perform a method described herein.

An example method in accordance with some embodiments may include: obtaining an image of a real-world scene; determining a first scene illuminant estimate; determining one or more regions of pixels in the image representing human skin; determining, for each region of pixels representing human skin, a first set of one or more skin reflectance functions approximating a skin reflectance of the first scene illuminant estimate; determining, for each region of pixels representing human skin, a first expected pixel value corresponding to an illuminant spectrum of the first scene illuminant estimate and the first set of skin reflectance functions; and selecting a second scene illuminant estimate to minimize, for each region of pixels representing human skin, an error between a color value of a corresponding pixel of the image and a second expected pixel value corresponding to an illuminant spectrum of the second scene illuminant estimate and a second set of skin reflectance functions approximating a skin reflectance of the second scene illuminant estimate.

An example method in accordance with some embodiments may include: capturing an image of a real-world environment; detecting a region of the image representing human skin; determining a representative color value of the region; selecting, from a plurality of prospective color values, a skin color value most closely matching the representative color value; and identifying an illuminant type associated with the skin color value.

Some embodiments of the example method may further include rendering a virtual object with colors selected based on the identified illuminant type.

For some embodiments of the example method, the plurality of prospective color values may include a database.

For some embodiments of the example method, the plurality of prospective color values may include a parameterized model.

For some embodiments of the example method, determining the representative color value of the region may include averaging two or more color values each associated with a respective portion of the region.

For some embodiments of the example method, the plurality of perspective color values may include a device-dependent color space.

For some embodiments of the example method, the plurality of perspective color values may include a device-independent color space.

For some embodiments of the example method, selecting the skin color value may include minimizing a plurality of respective difference values between the representative color value and the plurality of prospective color values.

For some embodiments of the example method, identifying the illuminant type may include determining a skin reflectance value corresponding to the skin color value.

For some embodiments of the example method, identifying the illuminant type may include: selecting an estimated illuminant type from a plurality of prospective illuminant types; determining a reflectance value corresponding to the skin color value and the estimated illuminant type; and updating iteratively the estimated illuminant type to be the identified illuminant type using at least one of the determined reflectance value, the representative color value, and the selected skin color value.

For some embodiments of the example method, updating iteratively the estimated illuminant type may include performing an iterative process that may include: determining an expected color value for a portion of the region using the estimated illuminant type; and updating the estimated illuminant type to reduce a difference between the expected color value and a captured color value of the portion of the region, wherein the iterative process may be repeated until the difference is less than a threshold.

For some embodiments of the example method, identifying the illuminant type may include: performing, for each prospective illuminant selected from a plurality of illuminants, an iterative illuminant comparison process that may include: selecting the prospective illuminant from the plurality of illuminants; and comparing the representative color value with an expected skin value determined using the prospective illuminant; and selecting the illuminant type from the plurality of illuminants using the comparison of the representative color value with the expected skin value determined using the respective prospective illuminant.

For some embodiments of the example method, comparing the representative color value with the expected skin value may include: calculating a spectral power distribution of the prospective illuminant, wherein the expected skin value may be determined using the spectral power distribution of the prospective illuminant.

For some embodiments of the example method, rendering the virtual object may render the virtual object in an augmented reality display environment of a head-mounted device (HMD), and rendering the virtual object may overlay the virtual object over the captured image of the real-world environment.

Some embodiments of the example method may further include displaying the virtual object on a see-through augmented reality display, wherein capturing the image may be captured by a camera of the see-through augmented reality display.

For some embodiments of the example method, the method may be performed in real time.

For some embodiments of an example method, the image may include at least one frame of a video.

For some embodiments of the example method, selecting the skin color value may include selecting a prospective skin color value from a plurality of skin color values that has a minimum error measure in comparison with the representative skin color value.

For some embodiments of the example method, the illuminant type may be selected from the group consisting of incandescent, fluorescent, sunlight, and simulated illuminants.

An example apparatus in accordance with some embodiments may include: a camera; a processor; and a non-transitory computer-readable medium storing instructions that are operative, when executed by the processor, to perform any of the methods described herein.

For some embodiments of the example apparatus, the apparatus may be an augmented reality head-mounted device (HMD).

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method comprising:
    obtaining an image of a real-world environment;
    determining at least one area of the image representing human skin;
    determining a representative color value for at least one of the areas of the image representing human skin;
    comparing the representative color value with a plurality of expected skin color values, each expected skin color value being associated with a respective one of a plurality of prospective illuminants;
    selecting an estimated illuminant from the plurality of prospective illuminants based at least in part on the comparison of the representative color value; and
    rendering a virtual object using color values computed based on the selected estimated illuminant.

2. The method of claim 1, wherein the representative color value is an average of color values for the area of the image representing human skin.

3. The method of claim 1, wherein the representative color value is an sRGB, CIE RGB, CIE XYZ, CIELUV, or CIELAB value.

4. The method of claim 1, wherein determining the representative color value and comparing the representative color value are performed in a device-dependent color space.

5. The method of claim 1, wherein determining the representative color value and comparing the representative color value are performed in a device-independent color space.

6. The method of claim 1, wherein the expected skin color value is based at least in part on a spectral power distribution of the prospective illuminant.

7. The method of claim 1, wherein the plurality of expected skin color values are stored in a database associating each expected skin color value with a respective prospective illuminant.

8. The method of claim 1, wherein selecting the estimated illuminant comprises minimizing a plurality of difference values, each difference value corresponding to a difference for one of the at least one determined areas of the image representing human skin between the representative color value and the expected skin color value.

9. The method of claim 1, further comprising updating iteratively the prospective illuminant based on the comparison of the representative color value with the expected skin color value corresponding to the prospective illuminant prior to updating until a difference between the representative color value and the expected skin color value is less than a threshold.

10. The method of claim 1, wherein the prospective illuminant is a mixture of two or more illuminants chosen from the plurality of illuminants.

11. An apparatus comprising one or more processors configured to perform at least:
obtaining an image of a real-world environment;
determining at least one area of the image representing human skin;
determining a representative color value for at least one of the areas of the image representing human skin;
comparing the representative color value with a plurality of expected skin color values, each expected skin color value being associated with a respective one of a plurality of prospective illuminants;
selecting an estimated illuminant from the plurality of prospective illuminants based at least in part on the comparison of the representative color value; and
rendering a virtual object using color values computed based on the selected estimated illuminant.

12. The apparatus of claim 11, wherein the representative color value is an average of color values for the area of the image representing human skin.

13. The apparatus of claim 11, wherein the representative color value is an sRGB, CIE RGB, CIE XYZ, CIELUV, or CIELAB value.

14. The apparatus of claim 11, wherein determining the representative color value and comparing the representative color value are performed in a device-dependent color space.

15. The apparatus of claim 11, wherein determining the representative color value and comparing the representative color value are performed in a device-independent color space.

16. The apparatus of claim 11, wherein the expected skin color value is based at least in part on a spectral power distribution of the prospective illuminant.

17. The apparatus of claim 11, wherein the plurality of expected skin color values are stored in a database associating each expected skin color value with a respective prospective illuminant.

18. The apparatus of claim 11, wherein selecting the estimated illuminant comprises minimizing a plurality of difference values, each difference value corresponding to a difference for one of the at least one determined areas of the image representing human skin between the representative color value and the expected skin color value.

19. The apparatus of claim 11, further configured to update iteratively the prospective illuminant based on the comparison of the representative color value with the expected skin color value corresponding to the prospective illuminant prior to updating until a difference between the representative color value and the expected skin color value is less than a threshold.

20. The apparatus of claim 11, wherein the prospective illuminant is a mixture of two or more illuminants chosen from the plurality of illuminants.

* * * * *